(12) United States Patent
Boratav et al.

(10) Patent No.: US 11,169,348 B2
(45) Date of Patent: Nov. 9, 2021

(54) COLORED RIBBON WITH DISCRETE COLOR LAYERS

(71) Applicant: CORNING RESEARCH & DEVELOPMENT CORPORATION, Corning, NY (US)

(72) Inventors: Olus Naili Boratav, Ithaca, NY (US); Julie Ann Chalk, Hickory, NC (US); David Wesley Chiasson, Edmonton (CA); Gregory Alan Mills, Clemmons, NC (US); Girish Arun Saigaonkar, Pune (IN); Randall Dwaine Tuttle, Claremont, NC (US); Xiaomin Zhao, Hickory, NC (US)

(73) Assignee: CORNING RESEARCH & DEVELOPMENT CORPORATION, Corning, NY (US)

(*) Notice: Subject to any disclaimer, the term of this patent is extended or adjusted under 35 U.S.C. 154(b) by 0 days.

(21) Appl. No.: 16/806,278

(22) Filed: Mar. 2, 2020

(65) Prior Publication Data

US 2020/0310056 A1 Oct. 1, 2020

Related U.S. Application Data

(60) Provisional application No. 62/825,389, filed on Mar. 28, 2019.

(51) Int. Cl.
*G02B 6/44* (2006.01)

(52) U.S. Cl.
CPC ............. *G02B 6/447* (2013.01); *G02B 6/448* (2013.01); *G02B 6/4482* (2013.01)

(58) Field of Classification Search
CPC ....... G02B 6/447; G02B 6/448; G02B 6/4482
(Continued)

(56) References Cited

U.S. PATENT DOCUMENTS 6,381,390 B1 4/2002 Hutton et al.
6,498,883 B1 12/2002 Wilson
(Continued)

FOREIGN PATENT DOCUMENTS

WO 2020041199 A1 2/2020

OTHER PUBLICATIONS

International Search Report and Written Opinion of the International Searching Authority; PCT/US2020/020611; dated Jun. 10, 2020; 16 Pages; Commissioner for Patents.
(Continued)

*Primary Examiner* — Jerry M Blevins
(74) *Attorney, Agent, or Firm* — William D. Doyle (57) ABSTRACT

Embodiments of the disclosure relate to an optical fiber ribbon. The optical fiber ribbon includes optical fibers arranged in a row having a first width. Indicator fibers are provided at the edges of the row. The indicator fibers have different color fiber jackets. The optical fiber ribbon also includes a primary matrix into which the plurality of optical fibers is embedded. The optical fiber ribbon also includes an opacifying layer having a second width and a color layer, distinct from the opacifying layer, having a third width. The optical fiber ribbon further includes a layer of printing disposed on an outer surface of the primary matrix. In the optical fiber ribbon, the first width is greater than at least one of the second width or the third width such that the indicator fibers extend past at least one of the opacifying layer or the color layer.

12 Claims, 9 Drawing Sheets

(58) Field of Classification Search
USPC .......................................................... 385/114
See application file for complete search history.

(56) References Cited

U.S. PATENT DOCUMENTS

| | | | |
|---|---|---|---|
| 6,532,329 B1 | 3/2003 | Thompson | |
| 6,731,844 B2 | 5/2004 | Conrad et al. | |
| 7,052,734 B2 | 5/2006 | Strait | |
| 7,923,483 B2 | 4/2011 | Chien et al. | |
| 9,513,449 B2 | 12/2016 | Blazer et al. | |
| 2002/0067900 A1* | 6/2002 | Mills | G02B 6/4482 385/114 |
| 2003/0223714 A1* | 12/2003 | Conrad | G02B 6/4404 385/114 |
| 2007/0238801 A1 | 10/2007 | Chien et al. | |
| 2018/0039035 A1* | 2/2018 | Chiasson | G02B 6/4403 |

OTHER PUBLICATIONS

ASTM D2805-96A (2003) Standard Test Method for Hiding Power of Paints by Reflectometry; 6 Pages; (2003).
ASTM D2805-11(2018) Standard Test Method for Hiding Power of Paints by Reflectometry; 6 Pages; (2018).

* cited by examiner

COLORED RIBBON WITH DISCRETE COLOR LAYERS

CROSS-REFERENCED TO RELATED APPLICATIONS

This application claims the benefit of priority under 35 U.S.C. § 119 of U.S. Provisional Application Ser. No. 62/825,389 filed on Mar. 28, 2019, the content of which is relied upon and incorporated herein by reference in its entirety.

BACKGROUND

The disclosure relates generally to optical fibers, and specifically to optical fiber ribbons having an opacifying and/or color layer with exposed indicator fibers. A single optical fiber cable may contain many optical fibers (indeed, hundreds of optical fibers), and during installation of a fiber optic cable network, managing the connections between the optical fibers can be difficult. Thus, various portions of the optical fiber cable, such as individual optical fibers, buffer tubes, or ribbons, may be color coded for the purposes of identification when making such connections.

SUMMARY

Embodiments of the disclosure relate to an optical fiber ribbon. The optical fiber ribbon includes a plurality of optical fibers arranged in a row having a first width. A first indicator fiber is provided at a first edge of the row, and a second indicator fiber is provided at a second edge of the row. The first indicator fiber has a first fiber jacket of a different color than a second fiber jacket of the second indicator fiber. The optical fiber ribbon also includes a primary matrix into which the plurality of optical fibers are embedded. The primary matrix has an outer surface. The optical fiber ribbon also includes an opacifying layer having a second width and being composed of a first base resin and an opacifier. The optical fiber ribbon also includes a color layer distinct from the opacifying layer. The color layer has a third width and includes a second base resin and a colorant. The colorant is different from the opacifier. The optical fiber ribbon further includes a layer of printing disposed on the outer surface of the primary matrix. In the optical fiber ribbon, the first width is greater than at least one of the second width or the third width such that the first indicator fiber and the second indicator fiber each extend past at least one of the opacifying layer or the color layer.

Additional embodiments of the disclosure relate to an optical fiber ribbon. The optical fiber ribbon includes a plurality of optical fibers arranged in a row having a first width. The plurality of optical fibers includes a first indicator fiber provided at a first edge of the row, a second indicator fiber provided at a second edge of the row, and at least a first interior fiber disposed between the first indicator fiber and the second indicator fiber. The first indicator fiber has a first fiber jacket of a different color than a second fiber jacket of the second indicator fiber. The optical fiber ribbon also includes a primary matrix into which the plurality of optical fibers are embedded. The primary matrix has an outer surface. The optical fiber ribbon includes a first color layer having a first base resin and a first colorant. The first color layer defines a first continuous coating over at least the first interior fiber. The optical fiber also includes a layer of printing disposed on the outer surface of the primary matrix. Further, the optical fiber includes a secondary matrix surrounding the primary matrix such that the layer of printing is disposed between the primary matrix and the secondary matrix.

Further embodiments of the disclosure relate to a method of preparing an optical fiber ribbon. In the method, a plurality of optical fibers are arranged in a row. The plurality of optical fibers includes a first indicator fiber at a first end of the row, a second indicator ribbon at a second end of the row, and at least one interior fiber disposed between the first indicator fiber and the second indicator fiber. In a first applicator, the at least one interior fiber is coated with an opacifying layer comprising a first base resin and an opacifier. A primary matrix is applied around the plurality of optical fibers in the first applicator during the step of coating. Information regarding characteristics of the optical fiber ribbon is printed onto the primary matrix, and a secondary matrix is applied around the primary matrix in a second applicator such that the printed information is disposed between the primary matrix and the secondary matrix.

Still further, embodiments of the disclosure relate to a method of preparing an optical fiber ribbon. In the method, a plurality of optical fibers is arranged in a row. The plurality of optical fibers includes a first indicator fiber at a first end of the row, a second indicator ribbon at a second end of the row, and at least a first interior fiber disposed in the row between the first indicator fiber and the second indicator fiber. In a first applicator, the first interior fiber is coated with a first color layer made up of a first base resin and a first colorant. A primary matrix is applied around the plurality of optical fibers in the first applicator during the step of coating. Information regarding characteristics of the optical fiber ribbon is printed onto the primary matrix. Further, a secondary matrix is applied around the primary matrix in a second applicator such that the printed information is disposed between the primary matrix and the secondary matrix.

Additional features and advantages will be set forth in the detailed description that follows, and, in part, will be readily apparent to those skilled in the art from the description or recognized by practicing the embodiments as described in the written description and claims hereof, as well as the appended drawings.

It is to be understood that both the foregoing general description and the following detailed description are merely exemplary, and are intended to provide an overview or framework to understand the nature and character of the claims.

The accompanying drawings are included to provide a further understanding and are incorporated in and constitute a part of this specification. The drawings illustrate one or more embodiment(s), and together with the description serve to explain principles and the operation of the various embodiments.

DETAILED DESCRIPTION

Referring generally to the figures, various embodiments of an optical fiber ribbon having exposed indicator fibers are provided. That is, in an optical fiber ribbon, the optical fibers between the two outside optical fibers (i.e., the "interior fibers") are partially or totally obscured by an opacifying layer and/or a color layer. Because the indicator fibers at the edge are not obscured or at least not obscured to the level of the interior optical fibers, a technician can discern the polarity (direction that light signals travel through an optical fiber) of the optical fiber based on the observable color-coded order of the optical fibers in the ribbon. The interior optical fibers are obscured using at least one of an opacifying layer or a color layer. The optical fibers are also embedded in a primary matrix and a secondary matrix with a printed layer therebetween. The printed layer provides another means of identification in addition to the indicator fibers. Advantageously, the opacifying layer and the color layer can be applied at the same time as the primary matrix and/or the secondary matrix using the same applicator.

As described herein, embodiments of the optical fiber ribbon have an opacifying layer applied over the optical fibers or over a primary matrix into which the optical fibers are embedded. Thereafter, printing is applied to the outside of the primary matrix, and a secondary matrix is applied over the printing to protect it from smudging. In embodiments, the secondary matrix acts as the color layer. In other embodiments, the color layer is applied over the fibers or over the opacifying layer. In still further embodiments, both an opacifying layer and a color layer are applied to one or both sides of the optical fibers, and the primary and secondary matrices are applied around the optical fibers with the printing contained therebetween. In still another embodiment, two or more color layers are applied to the optical fibers with an overlap region between at least two of the color layers. In this way, a first color region is provided over certain optical fibers, a second color region is provided over other optical fibers, and a third color region is provided in the overlap region over still other optical fibers. Each of these exemplary embodiments will be described in greater detail below, and these exemplary embodiments are provided by way of illustration, and not by way of limitation. These and other aspects and advantages will be discussed in relation to the embodiments provided below.

Figure 1:
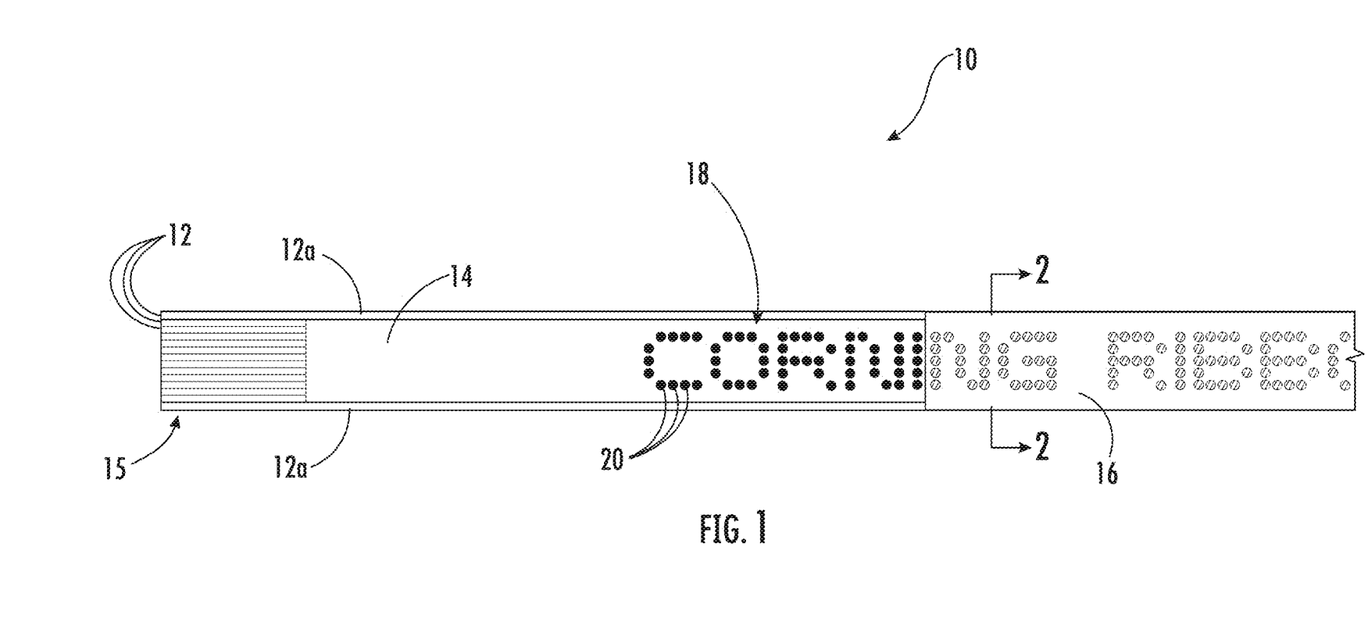
FIG. 1 is a plan view of a portion of an optical fiber ribbon, according to an exemplary embodiment.
Figure 3:
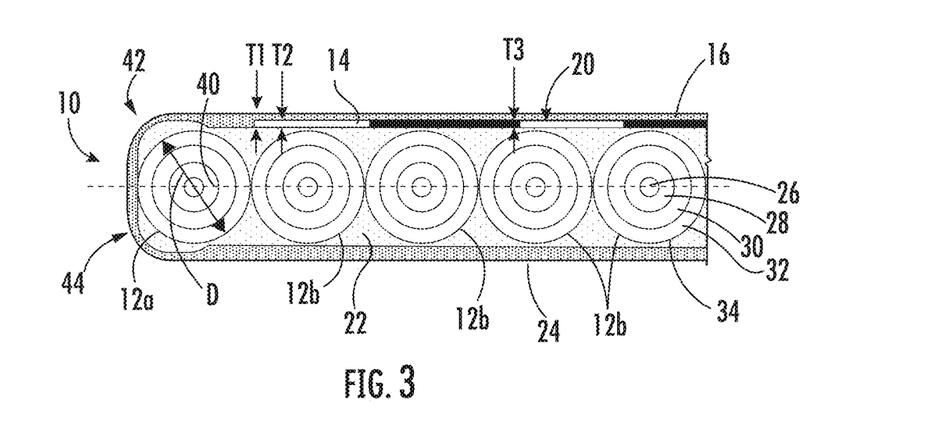
FIG. 3 is an enlarged view of a portion of the cross-section of FIG. 2, according to an exemplary embodiment.

FIG. 1 depicts an exemplary embodiment of an optical fiber ribbon 10 according to the disclosure. The optical fiber ribbon 10 includes a plurality of optical fibers 12 arranged in a substantially planar row. The number of optical fibers 12 contained in the row varies by embodiment. In embodiments, the number of optical fibers 12 in a row is from four to thirty-six. Further, in embodiments, the optical fibers 12 may be divided into subunits 15 of from two to twelve optical fibers 12. In the embodiment shown in FIG. 1, the optical fiber ribbon 10 includes a single subunit 15 of twelve optical fibers 12. In the optical fiber ribbon 10, the optical fibers 12 are coated with an opacifying layer 14 and a color layer 16. As will be described more fully below, the optical fiber ribbon 10 has indicator fibers 12a (generally, at least the optical fibers 12 located at the edges of the row of optical fibers 12) that are used to provide a reference polarity. In order to provide reference polarity, the indicator fibers 12a are left at least partially uncovered by at least one of the opacifying layer 14 and the color layer 16. That is, the optical fibers 12 between the indicator fibers 12a (referred to as "interior fibers" 12b as shown in FIG. 3), are more obscured than the indicator fibers 12a, allowing the indicator fibers 12a to more readily stand out visibly on the optical fiber ribbon 10.

As can also be seen in FIG. 1, the optical fiber ribbon 10 includes a printing layer 18, which is made up of ink dots 20. The ink dots 20 may be used to provide identifying characteristics of the optical fiber ribbon 10 in the printing 18 layer.

Figure 2:
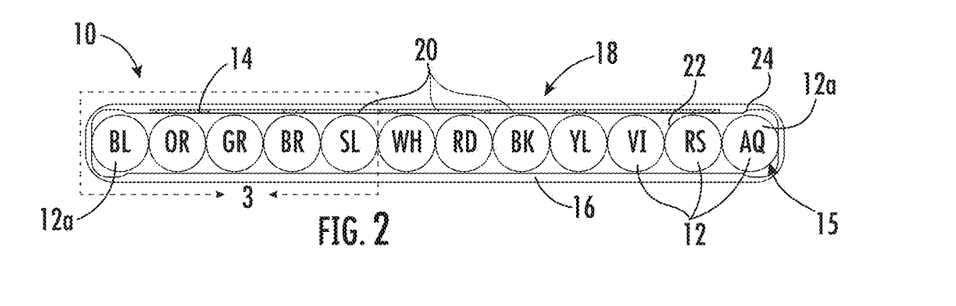
FIG. 2 is a cross-sectional view of the optical fiber ribbon taken along line 2-2 of FIG. 1, according to an exemplary embodiment.

As shown in FIG. 2, a primary matrix 22 holds the plurality of optical fibers 12 such that they are substantially parallel, adjacent, and are disposed, at least at a given cross section of the optical fiber ribbon 10, in substantially the same planar row. In embodiments, the longitudinal axis of each optical fiber 12 is substantially parallel to and coplanar with its adjacent optical fiber 12. The primary matrix 22 is coated with a secondary matrix 24. As can be seen in the embodiment of FIG. 2, the optical fiber ribbon 10 has a "dog-bone" structure in which the primary matrix 22 is thicker at the end regions. In these regions, the thickness of the secondary matrix 24 may reduce to approximately 0 µm. In the embodiment depicted, the printing layer 18 is contained between the primary matrix 22 and the secondary matrix 24. As mentioned briefly above, by placing the printing layer 18 between the primary matrix 22 and the secondary matrix 24, the printing layer 18 is advantageously protected from accidental removal or abrasion, especially during installation, thereby preserving the legibility of the printing layer 18.

In embodiments, the optical fibers 12 embedded in the primary matrix 22 are color coded as shown by the color abbreviations in FIG. 2. For example, the optical fibers 12 going from left to right are color coded as follows: BL—blue; OR—orange; GR—green; BR—brown; SL—slate; WH—white; RD—red; BK—black; YL—yellow; VI—violet; RS—rose; and AQ—aqua. In embodiments containing more than twelve optical fibers 12, the pattern of colors may be repeated. The optical fibers 12 are color coded in this way to help organize and identify specific fibers 12 when making connections or splices. Further, as mentioned above, the indicator fibers 12a are less obscured by the opacifying layer 14 and/or color layer 16 than the interior fibers 12b. In this way, a technician can use the color coding of the optical fibers 12 to determine polarity of the optical fiber ribbon 10 based on the indicator fibers 12b.

The color of the optical fibers 12 can make reading the printing layer 18 between the primary matrix 22 and the secondary matrix 24 difficult. In particular, the darker colored fibers 12 tend to limit the contrast between the ink of the printing layer 18 and the background. Thus, the opacifying layer 14 (or, in embodiments, the color layer 16) creates a contrasting background for the printing layer 18. In a particular embodiment, the opacifying layer 14 includes a pigment, ink, dye, or other colorant as an opacifier. In embodiments, the pigment provides the opacifying layer 14 with a color of white, gray, or black.

In terms of the CIE L*c*h* color space, using a white opacifier causes the lightness (L*) values for all of the optical fibers 12 to increase, which makes the color whiter, and the saturation (chroma—c*) decreases, which decreases the intensity of the colors. The hue angle h* for the colors remains the same. By increasing lightness and decreasing chroma, the optical fibers 12 become less visible through the opacifying layer 14. In this way, the printing layer 18 is able to contrast more with the underlying opacifying layer 14. In some embodiments, the color layer 16 is provided below the printing layer 18. In such embodiments, the color layer 16 may contain an opacifier to enhance contrast.

As can be seen in FIGS. 1 and 2, the printing layer 18 is comprised of a plurality of dots 20 of ink. In embodiments, the ink dots 20 are printed using inkjet printing on the opacifying layer 14 or primary matrix 22. In embodiments, the ink dots 20 are substantially circular and have a diameter of from 200 μm to 350 μm. In embodiments, the dots have a thickness of 2 μm to 10 μm. In embodiments, the color of the ink dots 20 is selected to provide good contrast with the color of the opacifying layer 14. For example, when the opacifying layer 14 is white, the ink dots 20 may be selected to be black. An example of a black ink suitable for use for the ink dots 20 is MB175 (available from Markem-Imaje, Switzerland). In another example, when the opacifying layer 14 is black or gray, the ink dots 20 may be selected to be yellow. An example of a yellow ink suitable for use for the ink dots 20 is Yellow MC258 (available from Markem-Imaje, Switzerland). Other color combinations between the ink dots 20 and the opacifying layer 14 are possible, and these examples are provided by way of illustration only and not by way of limitation.

FIG. 3 provides an enlarged view of a portion of the optical fiber 10. In FIG. 3, the structure of the optical fibers 12 is depicted. The optical fibers 12 are comprised of a core 26 surrounded by a cladding 28. Optical signals are carried by the core 26, and the cladding 28 substantially prevents the optical signals from escaping the core 26 during transmission. In embodiments, the cladding 28 is coated with a primary coating 30 that is made of a relatively softer, cushioning material. The primary coating 30 is further coated with a secondary coating 32 that is made of a harder material to provide abrasion resistance. Disposed outside of the secondary coating 32 is a fiber jacket 34 that comprises, e.g., a dye, an ink, or a pigment that provides one of the color-coded identifying colors discussed above for the fiber 12.

As can be seen in FIG. 3, the primary matrix 22 is provided above and below the optical fibers 12 as well as in the spaces between optical fibers 12 (although, in practice, the primary matrix 22 may not entirely fill the space between optical fibers 12 and air gaps may be present between adjacent optical fibers 12). In embodiments, the optical fibers 12 are embedded in the primary matrix 22, which forms a continuous and contiguous layer of polymer material around the optical fibers 12. In various embodiments, substantially all of the outer surface of the fiber jacket 34 contacts the primary matrix 22. In the embodiment depicted in FIG. 3, the opacifying layer 14 is coated over the primary matrix 22 and is embedded in the secondary matrix 24, which serves as the color layer 16.

FIG. 3 depicts a midline 40 of the cross-section of the optical fiber ribbon 10. The midline 40 divides the optical fiber ribbon 10 into a first portion 42 and a second portion 44. With respect to the orientation of the FIG. 3, the first portion 42 is shown as the upper portion of the optical fiber ribbon 10, and the second portion 44 is shown as the lower portion of the optical fiber ribbon 10. In the embodiment of FIG. 3, the opacifying layer 14 is located only in the first portion 42, but in other embodiments, the opacifying layer 14 may additionally or alternatively be located in the second portion 44.

In embodiments, the average thickness T1 of the secondary matrix 24 is from 10 μm to 35 μm. The average thickness T2 of the opacifying layer 14 is from 20% to 100% of T1, or from 2 μm to 35 μm. As mentioned above, the average thickness T3 of the ink dots 20 is from 2 μm to 10 μm. As described, opacifying layer 14 is able to obscure a portion of the color of the fiber jacket 34 so as to provide a contrasting background for the ink dots 20 of the printing layer 18. Further, the color layer 16, which is incorporated in the secondary matrix 24, provides identification of the optical fiber ribbon 10. In the embodiment depicted, the primary matrix 22 is uncolored and unopacified.

As discussed above, the indicator fibers 12a are left at least partially uncovered by the opacifying layer 14. In embodiments, each optical fiber 12 has a diameter D, and the optical fibers 12 are arranged in a planar row and in an edge-to-edge fashion such that the number N of optical fibers 12 defines a width of approximately D*N (with some small gaps potentially existing between adjacent optical fibers 12). In each of the embodiments described here, at least one of the opacifying layer 14 or the color layer 16 has a width that is less than the width of the planar row of optical fibers 12. In this way, the indicator fibers 12a will extend (at least partially) past one or both of the opacifying layer 14 and the color layer 16. In this way, the interior fibers 12b will be obscured by both the opacifying layer 14 and the color layer 16, whereas the indicator fibers 12a will have at least a region that is only obscured by at most one of the opacifying layer 14 or the color layer 16.

With respect to the embodiment shown in FIG. 3, the color layer 16 is incorporated into the secondary matrix 24, and thus, the color layer 16 has a width wider than the width of the planar row of optical fibers 12. As can be seen, though, the opacifying layer 14 has a width that is less than width of the planar row of optical fibers 12. In embodiments, the width of the opacifying layer 14 is selected to be at least about D(N−2). In such embodiments, the opacifying layer 14 may be substantially centered over the interior fibers 12b such that equal amounts (about an entire diameter D) of the indicator fibers 12a at the edge of the row are exposed. In other embodiments, the width of the opacifying layer 14 is selected to be no more than D(N−0.5). In such embodiments, the opacifying layer 14 may be centered over the interior fibers 12b such that about 0.25D of each indicator fiber 12a at the edge of the row is exposed. In the other embodiments described below, either one or both of the opacifying layer 14 or the color layer 16 may, in embodiments, have a width of from D(N−2) to D(N−0.5).

Figure 4:
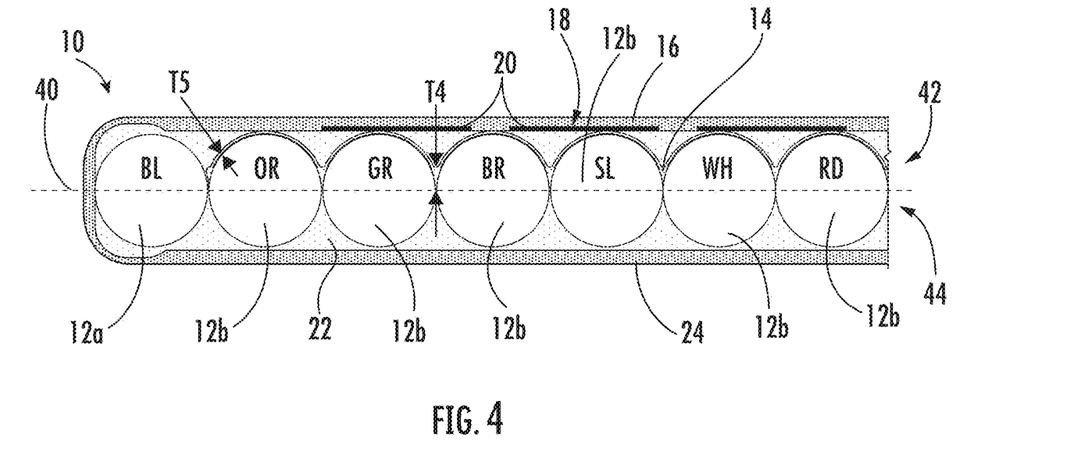
FIG. 4 schematically depicts a partial cross-sectional view of an optical fiber ribbon, according to another exemplary embodiment.

FIG. 4 depicts another embodiment of an optical fiber ribbon 10 that is substantially similar to the embodiment shown in FIG. 3 with the exception that, in the embodiment of FIG. 4, the opacifying layer 14 is coated onto the optical fibers 12 instead of the primary matrix 22. As shown in FIG.

4, the opacifying layer 14 is coated onto the interior fibers 12b and is located in the first portion 42 above the midline 40. However, in other embodiments, the opacifying layer 14 may be located additionally or alternatively in the second portion 44 below the midline 40. In embodiments, the opacifying layer 14 has an average thickness T4 proximal to the midline 40 (i.e., in the region between adjacent optical fibers 12) of 5 µm to 50 µm and an average thickness T5 over the remainder of the optical fibers 12 of from 5 µm to 50 µm.

In the embodiment of FIG. 4, the primary matrix 22 is provided around the optical fibers 12 and the opacifying layer 14. That is, the optical fibers 12 and opacifying layer 14 are embedded in the primary matrix 22, which forms a continuous and contiguous layer of polymer material around the optical fibers 12 and the opacifying layer 14. As with the previous embodiment, the printing layer 18 is applied in ink dots 20 over the primary matrix 22, and the secondary matrix 24, which incorporates the color layer 16, is applied around the printing 18 and primary matrix 22. In the embodiment depicted, the primary matrix 22 is uncolored and unopacified.

Figure 5:
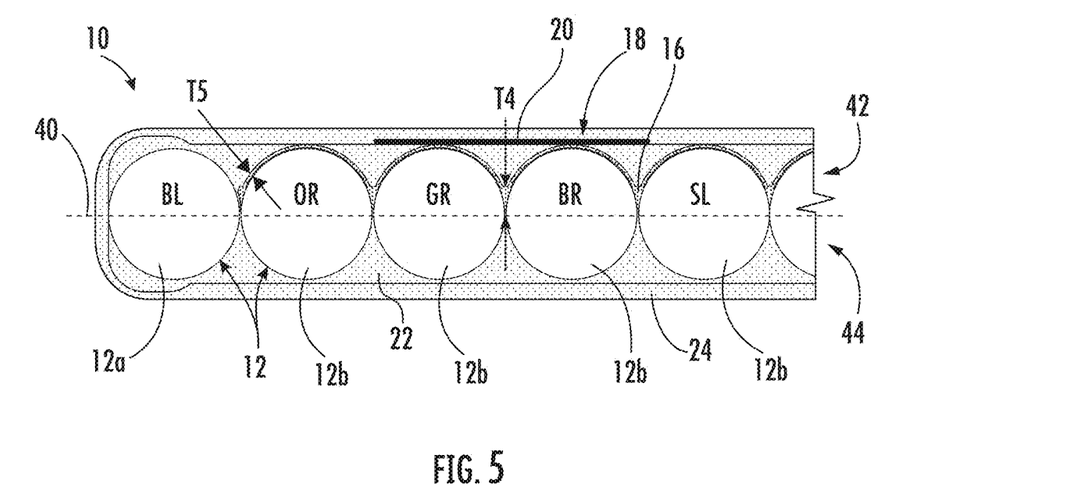
FIG. 5 schematically depicts a partial cross-sectional view of an optical fiber ribbon, according to a further exemplary embodiment.

FIG. 5 depicts another embodiment of an optical fiber ribbon 10 having just a color layer 16. In this embodiment, the color layer 16 is coated onto the interior fibers 12b, leaving the indicator fibers 12b at the edge of the row exposed. In the embodiment shown in FIG. 5, the color layer 16 is located in the first portion 42 above the midline 40. However, in other embodiments, the color layer 16 may be located additionally or alternatively in the second portion 44 below the midline 40. The color layer 16 has an average thickness T4 proximal to the midline 40 in the space between the optical fibers 12 of from 5 µm to 50 µm and an average thickness T5 over the remainder of each optical fiber 12 of from 5 µm to 50 µm. In embodiments, an opacifier may be incorporated into the color layer 16. That is, the color layer 16 can contain both a colorant and an opacifier, which is applied over the interior fibers 12b.

In the embodiment of FIG. 5, the primary matrix 22 is provided around the optical fibers 12 and the color layer 16. That is, the optical fibers 12 and color layer 16 are embedded in the primary matrix 22, which forms a continuous and contiguous layer of polymer material around the optical fibers 12 and the color layer 16. As with the previous embodiments, the printing layer 18 is applied in ink dots 20 over the primary matrix 22, and the secondary matrix 24 is applied around the printing 18 and primary matrix 22. In the embodiment depicted, the primary matrix 22 and the secondary matrix 24 are both uncolored and unopacified.

Figure 6:
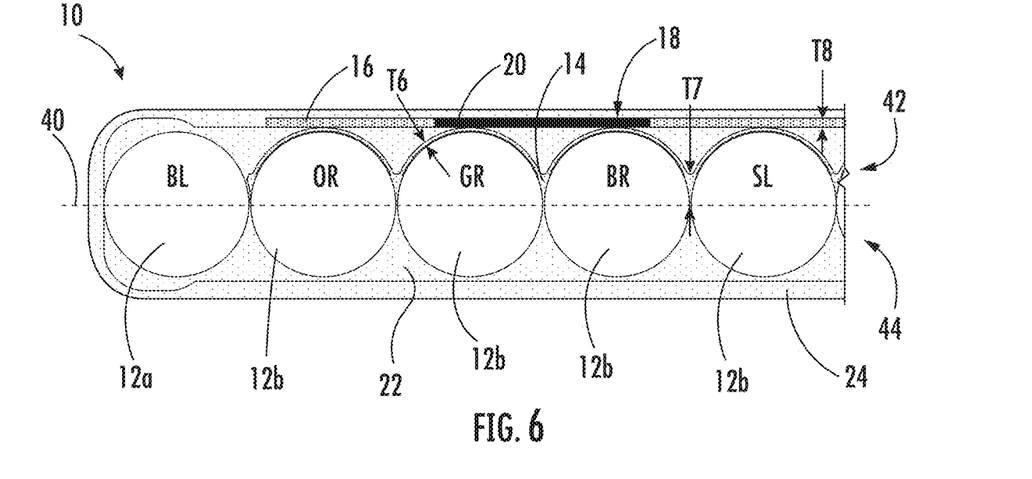
FIG. 6 schematically depicts a partial cross-sectional view of an optical fiber ribbon, according to yet another exemplary embodiment.

FIG. 6 depicts an embodiment having both the opacifying layer 14 and the color layer 16, which are also both distinct from the primary matrix 22 and the secondary matrix 24. As shown in FIG. 6, the opacifying layer 14 is applied over the interior fibers 12b, and the color layer 16 is applied over the primary matrix 22 and is embedded in the secondary matrix 24. In the embodiment depicted, the opacifying layer 14 and the color layer 16 both terminate at the last interior fiber 12b, leaving the indicator fiber 12a at each edge of the row unobscured. However, in other embodiments, the color layer 16 or opacifying layer 14 could extend further than the other layer. In embodiments, the opacifying layer 14 and the color layer 16 are located in the first portion 42 above the midline 40. However, in other embodiments, the opacifying layer 14 and the color layer 16 may be located additionally or alternatively in the second portion 44 below the midline 40. In embodiments, the opacifying layer 14 has an average thickness T6 proximal to the midline 40 in the gap between adjacent optical fibers 12 of from 5 µm to 50 µm and an average thickness T7 over the remainder of the optical fiber 12 of from 5 µm to 50 µm. In embodiments, the color layer 16 has an average thickness T8 of from 2 µm to 15 µm.

In the embodiment of FIG. 6, the primary matrix 22 is provided around the optical fibers 12 and the opacifying layer 14. That is, the optical fibers 12 and opacifying layer 14 are embedded in the primary matrix 22, which forms a continuous and contiguous layer of polymer material around the optical fibers 12 and the opacifying layer 14. As with the previous embodiments, the printing 18 is applied in ink dots 20 over the primary matrix 22, and the secondary matrix 24, in which the color layer 16 is embedded, is applied around the printing 18 and primary matrix 22.

Figure 7:
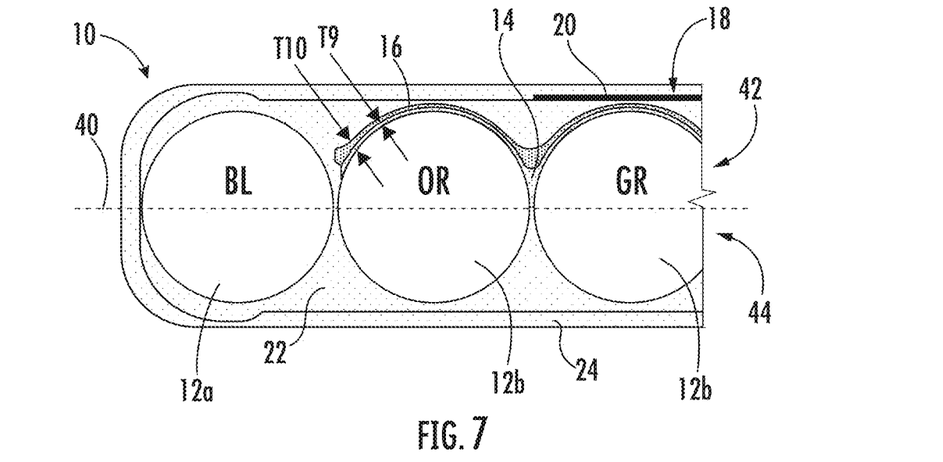
FIG. 7 schematically depicts a partial cross-sectional view of an optical fiber ribbon, according to still further exemplary embodiment.
Figure 8:
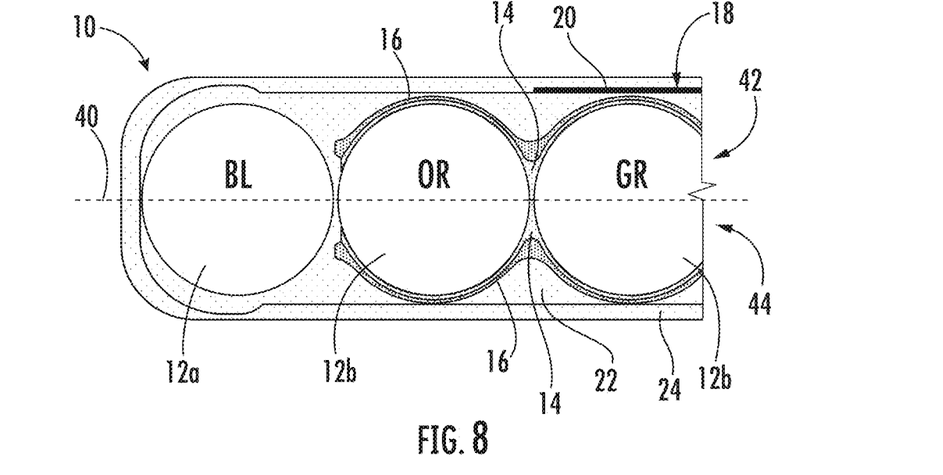
FIG. 8 schematically depicts a partial cross-sectional view, according to yet another exemplary embodiment.

FIG. 7 depicts another embodiment in which the opacifying layer 14 and the color layer 16 are both contained in the primary matrix 22. As shown in FIG. 7, the opacifying layer 14 is applied over the interior fibers 12b, and the color layer 16 is applied over the opacifying layer 14. In embodiments, the opacifying layer 14 and the color layer 16 are located in the first portion 42 above the midline 40. However, in other embodiments, such as shown in FIG. 8, the opacifying layer 14 and the color layer 16 may be located additionally or alternatively in the second portion 44 below the midline 40. In embodiments, the opacifying layer 14 has an average thickness proximal to the midline 40 in the gap between adjacent optical fibers similar to the average thickness disclosed with respect to the embodiments shown in FIGS. 4-6. In embodiments, the opacifying layer 14 has an average thickness T9 over the remainder of the optical fibers 12 of from 2 µm to 10 µm, and the color layer 16 has an average thickness T10 over the same region of the optical fibers 12 of from 2 µm to 10 µm.

In the embodiments of FIGS. 7 and 8, the primary matrix 22 is provided around the optical fibers 12, the opacifying layer 14, and the color layer 16. That is, the optical fibers 12, the opacifying layer 14, and the color layer 16 are embedded in the primary matrix 22, which forms a continuous and contiguous layer of polymer material around the optical fibers 12, the opacifying layer 14, and the color layer 16. As with the previous embodiments, the printing 18 is applied in ink dots 20 over the primary matrix 22, and the secondary matrix 24 is applied around the printing 18 and primary matrix 22.

Figure 9:
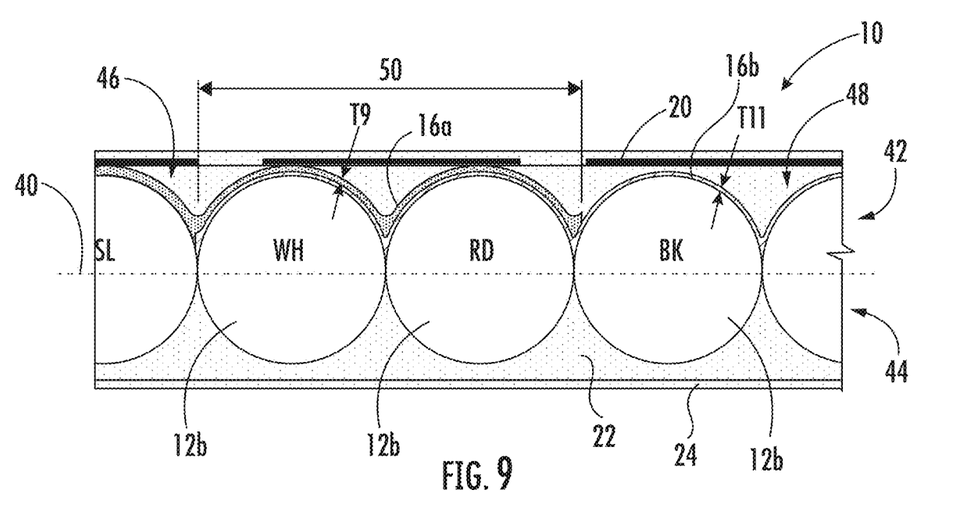
FIG. 9 schematically depicts a partial cross-sectional view, according to an additional exemplary embodiment.

FIG. 9 depicts an embodiment of an optical fiber ribbon 10 in which two color layers 16a, 16b are provided within the primary matrix 22. In particular, a first color layer 16a is provided over a first number of the interior fibers 12b, and a second color layer 16b is provided over a second number of the interior fibers 12b. Further, the color layers 16a, 16b overlap over at least one of the interior fibers 12b. In this way, the first color layer 16a provides a first region 46 of a first color, a second region 48 of a second color, and an overlap region 50 of a third color. For example, in an embodiment, the first color layer 16a is blue, and the second color layer 16b is red-orange. In such an embodiment, the overlap region 50 will be purplish in color when viewed from the exterior of the optical fiber ribbon 10.

In embodiments, the color layers 16a, 16b are located in the first portion 42 above the midline 40. However, in other embodiments, the color layers 16a, 16b may be located additionally or alternatively in the second portion 44 below the midline 40. In embodiments, the color layer 16a has an average thickness T9 over the portion of the optical fibers 12 outside of the region between adjacent optical fibers 12 of 2 µm to 10 µm, and the color layer 16b has an average thickness T11 over the portion of the optical fibers 12 outside of the region between adjacent optical fibers 12 of from 2 µm to 10 µm.

In the embodiment FIG. 9, the primary matrix 22 is provided around the optical fibers 12 and the color layers 16a, 16b. That is, the optical fibers 12 and the color layers 16a, 16b are embedded in the primary matrix 22, which forms a continuous and contiguous layer of polymer material around the optical fibers 12 the color layers 16a, 16b. As with the previous embodiments, the printing layer 18 is applied in ink dots 20 over the primary matrix 22, and the secondary matrix 24 is applied around the printing layer 18 and primary matrix 22.

Similar to leaving the indicator fibers 12a at least partially exposed, the color layers 16a, 16b and overlap region 50 can help to identify various regions of the optical fiber ribbon 10. In particular, in optical fiber ribbons 10 having twenty-four or more optical fibers 12, the color layers 16a, 16b and overlap region 50 can be alternated to set off particular groups of optical fibers 12. Further, in embodiments, more than two color layers 16a, 16b can be provided (e.g., three, four, five, or more different color layers 16a, 16b) to provide multiple different color regions and overlap regions.

Figure 10:
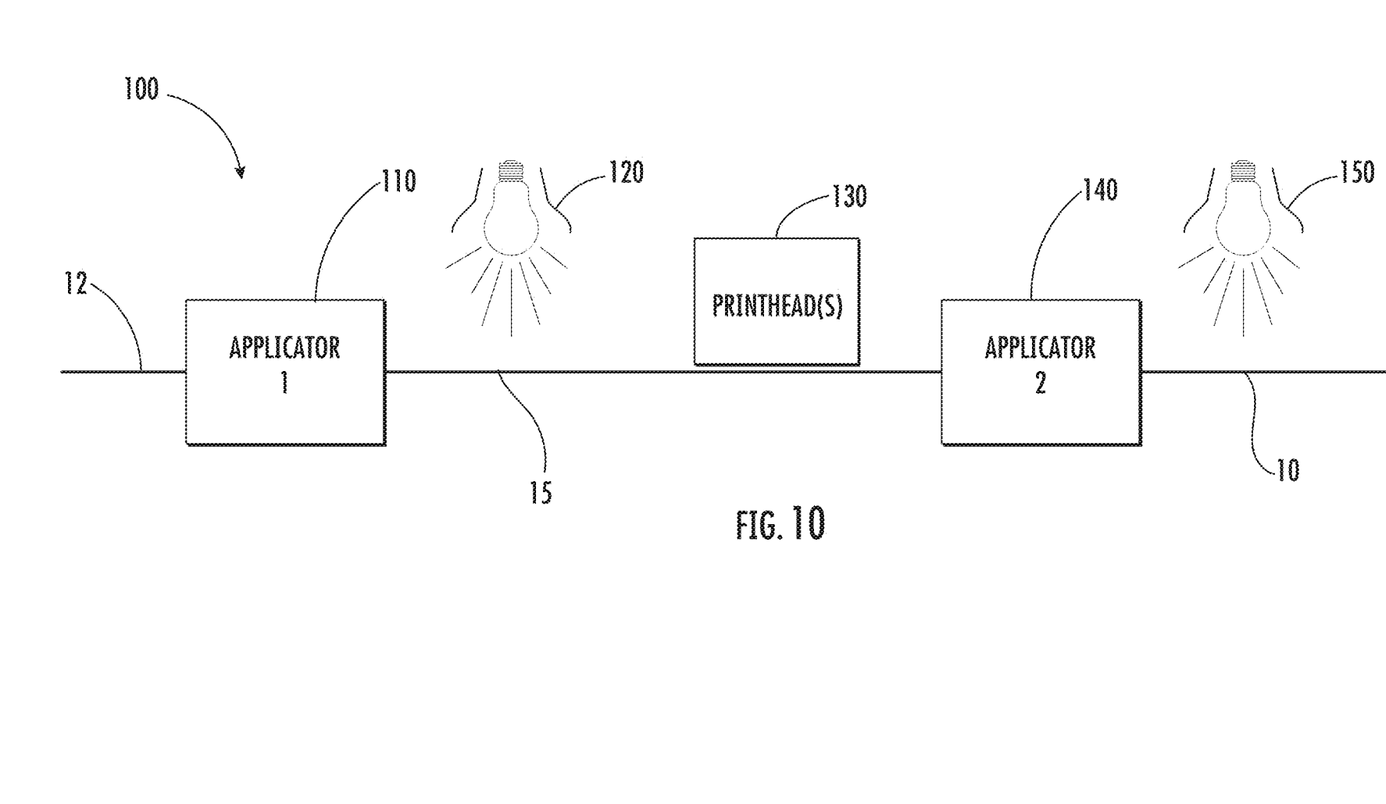
FIG. 10 is a schematic representation of a processing line for preparation of the various embodiments of the optical fiber ribbon, according to an exemplary embodiment.

FIG. 10 depicts a schematic representation of a processing line 100 for producing an optical fiber ribbon 10 according to the embodiments of the present disclosure. As can be seen in FIG. 10, individual optical fibers 12 that are arranged in a planar row enter a first applicator 110. In the first applicator 110, the primary matrix 22 is applied around the optical fibers 12 to produce ribbon subunits 15. In the first applicator 110, any opacifying layers 14 and/or color layers 16 that are in contact with the optical fibers 12 or are embedded in the primary matrix 22 (such as the embodiments shown in FIGS. 4-9) are applied in the first applicator 110. The 14 ribbon subunits 15 exit the first applicator 110 with the primary matrix 22 and any opacifying layer 14 and/or color layer 16 applicable to the particular embodiment. Thereafter, the ribbon subunits 15 are cured at first curing station 120, depicted as a UV-curing lamp. After curing, the printing 18 is applied to the primary matrix 22 via one or more printheads 130. In embodiments, the printheads 130 are inkjet printers that apply the ink dots 20 shown in FIGS. 1-9. After the printing 18 is applied, the subunits 15 enter a second applicator 140 for application of the secondary matrix 24 to form the optical fiber ribbon 10. As described above, the secondary matrix 24 itself may be the color layer 16 (e.g., FIGS. 3 and 4). Additionally, any opacifying layers 14 and/or color layers 16 that are in contact with the primary matrix 22 or embedded in the secondary matrix 24 (such as the embodiments shown in FIGS. 3 and 6) are applied in the second applicator 140. Upon exiting the second applicator 140, the optical fiber ribbon 10 is cured again at second curing station 150, again depicted as a UV-curing lamp.

Figure 11:
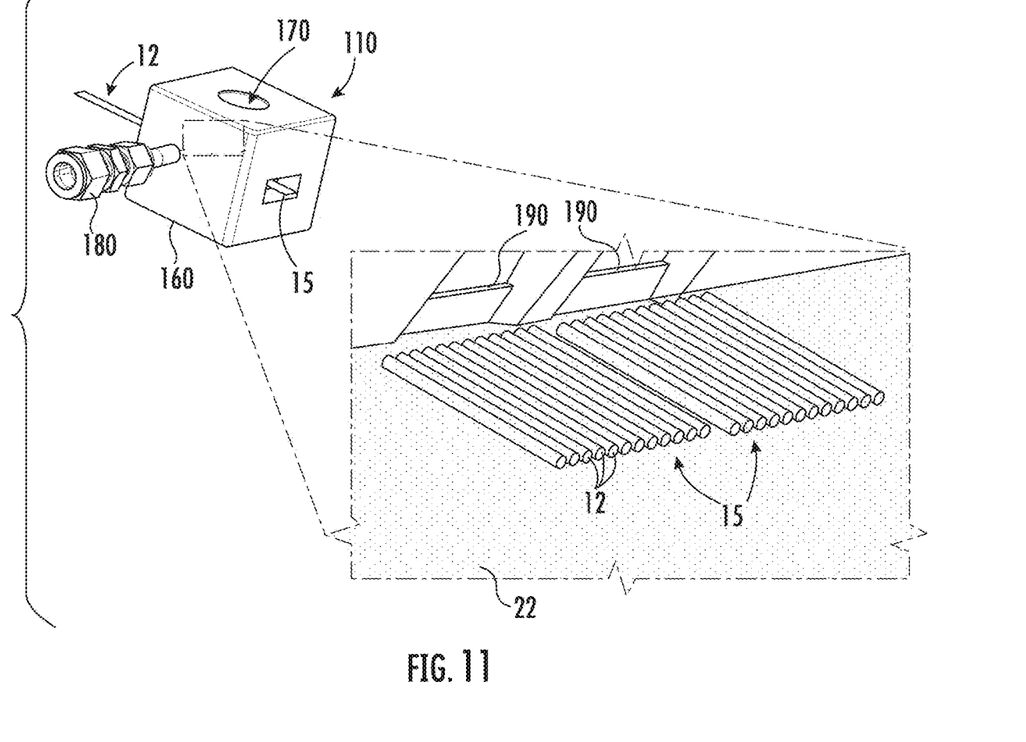
FIG. 11 depicts a schematic representation of a coating applicator, according to an exemplary embodiment.

FIG. 11 depicts an embodiment of the first applicator 110. While the first applicator 110 is shown, the second applicator 140 is substantially similar in design, and the following discussion applies as well to the second applicator 140. As can be seen in FIG. 11, the optical fibers 12 enter the first applicator 110 for application of the primary matrix 22. The first applicator 110 is depicted with a substantially cubic housing 160 having a first entry port 170 for the material of the primary matrix 22. The primary matrix 22 material is in a liquid form and is circulating within the housing 160 of the first applicator 110. The optical fibers 12 enter the housing 160 and are submerged in the primary matrix 22 material. As the optical fibers 12 pass through the first applicator 110, the primary matrix 22 material coats onto the outer surfaces of the optical fibers 12.

As mentioned above, opacifying layer 14 and/or color layer 16 are applied in the first applicator 110 along with the primary matrix 22. As shown in FIG. 11, a second entry port 180 is provided for the material of the opacifying layer 14 and/or the color layer 16. In the embodiment depicted, the second entry port 180 is arranged perpendicularly to the first entry port 170, and on the interior of the housing 160, slots 190 are formed such that the widths of the slots 190 are transverse to the longitudinal axis of the optical fiber 12. Further, the width of the slots 190 are designed to substantially match the width of the opacifying layer and/or color layer 16 to be applied to the subunit 15 (or optical fiber ribbon 10 in the case of the second applicator 140). Advantageously, the material for the opacifying layer 14 and/or color layer 16 simply be deposited from the slots 190 onto the optical fibers 12 as the circulation of the primary matrix 22 material within the housing 160 brings the material of the opacifying layer 14 and/or color layer 16 into contact with the surface of the optical fibers 12.

Figure 12:
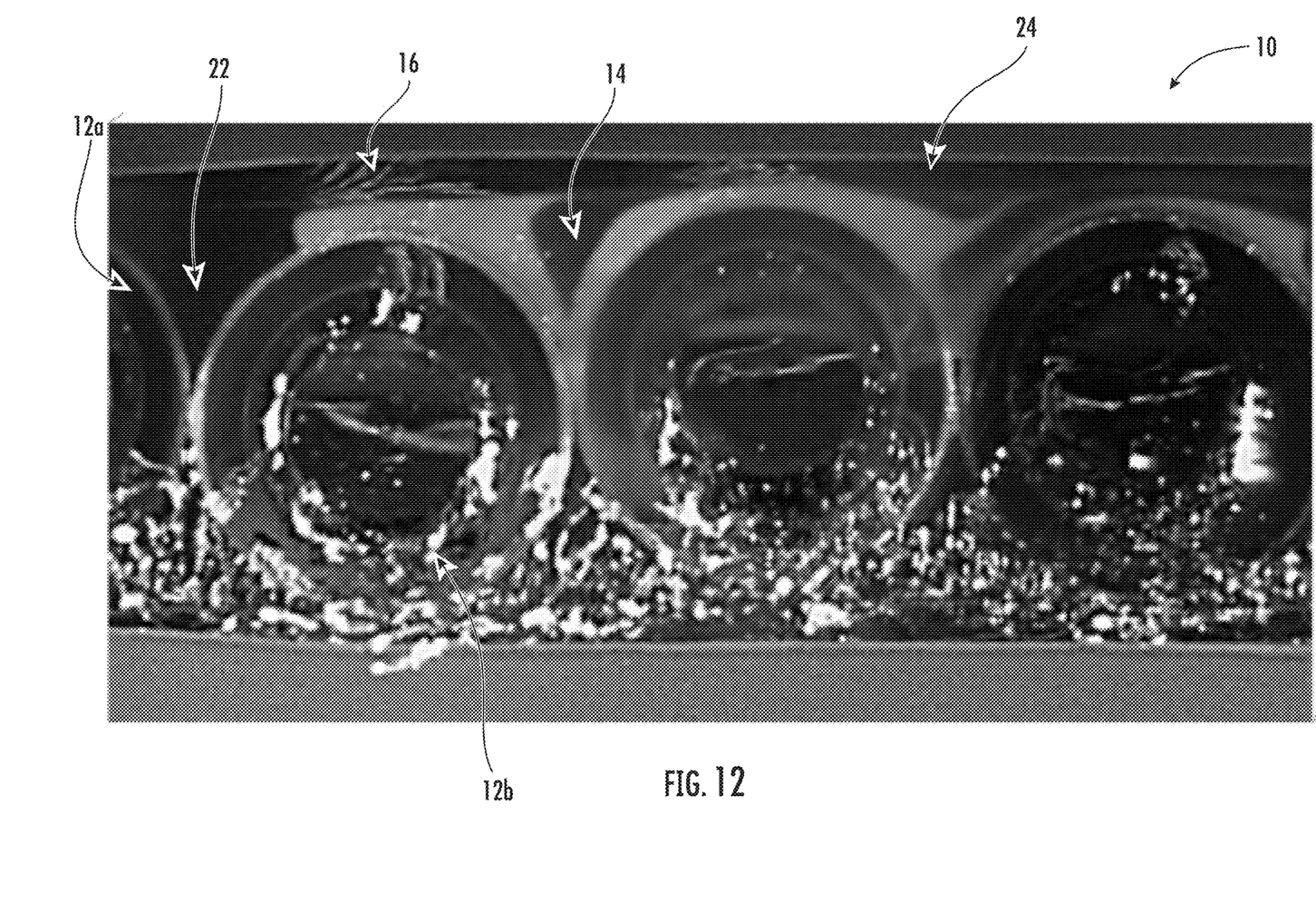
FIG. 12 is a photograph of a cross-sectional view of an optical fiber ribbon, showing the various coating layers, according to an exemplary embodiment.

FIG. 12 depicts a cross-section of an optical fiber ribbon 10 of the type shown in FIG. 4 produced in a processing line 100 as shown in FIG. 10, including using an applicator 110 as shown in FIG. 11. As can be seen in FIG. 12, the leftmost optical fiber is the indicator fiber 12a, and the three other optical fibers depicted are interior fibers 12b. The interior fibers 12b are all coated with an opacifying layer 14 that is contained within the primary matrix 22. The secondary matrix 24 is the color layer 16. FIG. 12 shows a sharp break in the opacifying layer 14 over the leftmost interior fiber 12b, leaving the indicator ribbon 12a uncovered by the opacifying layer 14. Because the indicator ribbon 12a is only partially obscured by the color layer 16 of the secondary matrix 24, the indicator ribbon 12a can be more easily discerned for determination of the polarity of the optical fiber ribbon 10.

Each of the opacifying layer 14, the color layer 16, the primary matrix 22, and the secondary matrix 24 may have a base resin selected from the compositions described below. The opacifying layer 14 and the color layer 16 will contain a pigment, ink, or dye to provide the opacifying or coloring effect, whereas the primary matrix 22 and the secondary matrix 24 (unless used as the opacifying layer 14 or the color layer 16) will not contain a pigment, ink, or dye and will be relatively clear or transparent. In embodiments, the base resin is a polymer material that is curable. In a particular embodiment, the base resin is a UV-curable resin comprising an oligomer component, a reactive diluent monomer component, and a photoinitiator. In embodiments, the oligomer is one or more acrylated, methacrylated, or vinyl functional oligomer, and in embodiments, the oligomer has an aliphatic urethane or epoxy backbone. In embodiments, the oligomer comprises 30 wt % to about 80 wt % of the UV-curable resin. In embodiments, the reactive diluent monomer component is one or more reactive diluent monomers having 1 to 5 functional groups of, e.g., acrylate, methacrylate, vinyl ether, or vinyl. In embodiments, the reactive diluent monomer comprises 5 wt % to 65 wt % of the UV-curable resin. In embodiments, the photoinitiator comprises from 0.1 wt % to 10 wt % of the UV-curable resin. In embodiments, the UV-curable resin may also include a variety of other additives in an amount of 0 wt % to 10 wt %, such as antioxidants, catalysts, lubricants, low molecular weight non-crosslinking resins, adhesion promoters, and stabilizers. In embodiments, the base resin comprises from 85 wt % to 99 wt % of the primary matrix 22, and the pigment comprises the remaining 1 wt % to 15 wt % of the primary matrix 22.

In embodiments of the UV-curable resin, the oligomers may be based on an aliphatic polyether polyol, which is reacted with an aliphatic polyisocyanate and then acrylated. In embodiments, the photoinitiator may include at least one photoinitiating compound selected from the group consisting of bis-acyl phosphine oxide; hydroxycyclohexylphenyl ketone; hydroxymethylphenylpropanone; dimethoxyphenylacetophenone; 2-methyl-1,4-(methyl thio)phenyl-2-morpholino-propanone-1; 1-(4-isopropylphenyl)-2-hydroxy-2-methylpropan-1-one; 4-(2-hydroxyethyoxy)phenyl-(2-hydroxy-2-propyl)ketone; 1-(4-dodecyl phenyl)-2-hydroxy-2-methylpropan-1-one; diethoxyacetophenone; 2,2-di-sec-butoxy-acetophenone; diethoxyphenyl acetophenone; bis(2,6-dimethoxybenzoyl)-2,4,4-trimethylpentylphosphine oxide; 2,4,6-trimethylbenzoyldiphenylphosphine oxide; 2,4,6-trimethylbenzoylethoxyphenylphosphine oxide; and mixtures thereof.

Further, in embodiments, examples of suitable reactive diluent monomers include (but are not limited to) isobornyl acrylate; $C_6$-$C_{12}$ hydrocarbon diol diacrylates; $C_6$-$C_{12}$ hydrocarbon diol dimethacrylates; tripropylene glycol diacrylate; tripropylene glycol dimethacrylate; neopentyl glycol, diacrylate; neopentyl glycol dimethacrylate; neopentyl glycol propoxylate diacrylate; neopentyl glycol propoxylate dimethacrylate; neopentyl glycol ethoxylate diacrylate; neopentyl glycol ethoxylate dimethacrylate; bisphenol A ethoxylate diacrylate; bisphenol A ethoxylate dimethacrylate; bisphenol A propoxylate diacrylate; bisphenol A propoxylate dimethacrylate; phenoxyethyl acrylate; phenoxyethyl methacrylate; phenoxyethyl ethoxylate acrylate; phenoxyethyl ethoxylate methacrylate; phenoxyethyl propoxylate acrylate; phenoxyethyl propoxylate methacrylate; polyethylene glycol nonylphenylether acrylate; polyethylene glycol nonylphenylether methacrylate; polypropylene glycol nonylphenylether acrylate; polypropylene glycol nonylphenylether methacrylate; isooctyl methacrylate; octyl acrylate; octyl methacrylate; decyl acrylate; decyl methacrylate; isodecyl acrylate; isodecyl methacrylate; lauryl acrylate; lauryl methacrylate; tridecyl acrylate; tridecyl methacrylate; palmitic acrylate; palmitic methacrylate; stearyl acrylate; stearyl methacrylate; cetyl acrylate; cetyl methacrylate; tetrahydrofurfuryl acrylate; tetrahydrofurfuryl methacrylate; isobornyl acrylate; isobornyl methacrylate; dicyclopentenyl acrylate; dicyclopentenyl methacrylate; dicyclopentenyl ethoxylate acrylate; dicyclopentenyl ethoxylate methacrylate; dicyclopentenyl propoxylate acrylate; dicyclopentenyl propoxylate methacrylate; N-vinyl amides and mixtures thereof. Most preferred compounds include isobornyl acrylate, isocyanurate acrylate and particularly tris-hydroxyethyl isocyanurate triacrylate.

A variety of suitable opacifiers can be dispersed in the UV-base resin to form the opacifying layer 14. For a white opacifying layer 14, exemplary opacifier includes such pigments as $TiO_2$, $BaSO_4$, ZnO or ZnS. For a black opacifying layer 14, an exemplary opacifier pigment is carbon black. For a gray opacifying layer 14, the opacifier may be a combination of white and black pigments.

As discussed above, the color layer 16 is tinted with a colorant (e.g., one or more of dye(s), pigment(s), ink(s), etc.) so as to provide an identification element to the optical fiber ribbon 10. However, the color layer 16 is also configured to be semi-transparent such that the printing 18 can be seen beneath the color layer 16. As considered herein, the level of transparency of the color layer 16 is selected so as to achieve a desired contrast ratio according to ASTM D2805 of the color layer 16. As used herein, "contrast ratio" is defined as "the ratio of the reflectance of a film on a black substrate to that of an identical film on a white substrate." In performing a contrast ratio test according to ASTM D2805, the material tested is spread in an even layer over a test card having both a section of white background and a section of black background. Using reflectometry, the reflectance over the white section and the black section is measured. The ratio of these reflectances is the contrast ratio.

The contrast ratio can be adjusted by varying the amount of colorant used in the composition of the color layer 16 and by varying the thickness of the color layer 16. For example, for a given composition, the contrast ratio of the color layer 16 will increase as the thickness of the color layer 16 increases. Additionally, for a given thickness, the contrast ratio of the color layer 16 will increase as the amount of colorant pigment in the composition of the color layer 16 increases. Table 1 provides the colors of the color layer 16 as defined according the CIE L*c*h* color space, and Table 2 provides the contrast ratio ranges to achieve the desired level of transparency to be able to clearly discern the printing 18 beneath the color layer 16 while still being able to identify the color of the ribbon 10.

TABLE 1

Color Layer Color (>100 μm on White Background)

| Secondary Color | Lightness (L*) | Chroma (C*) (Full saturation) | Hue Angle (h*) |
|---|---|---|---|
| Blue | 55-80 | 60 | 220-270 |
| Orange | 57-82 | 60 | 50-80 |
| Green | 70-95 | 60 | 120-190 |
| Brown | 54-79 | 60 | 30-80 |
| Slate | 61-86 | 60 | 0-360 |
| White | 78-98 | 60 | 0-360 |
| Red | 46-71 | 60 | 330-50 |
| Black | 0-10 | 60 | 0-360 |
| Yellow | 73-98 | 60 | 70-120 |
| Violet | 60-85 | 60 | 260-330 |
| Rose | 59-84 | 60 | 0-25 |
| Aqua | 67-92 | 60 | 180-230 |

TABLE 2

Contrast Ratio of Color Layer as tested according to ASTM 2805

| Material | Film thickness (microns) | Contrast Ratio ($C_w$) |
|---|---|---|
| White Opacifying layer | 20-300 | 0.2-0.7 |
| Black Ink | 20-300 | 0.8-0.98 |
| Yellow Ink | 20-300 | 0.5-0.7 |
| Color Layer | | |
| Blue | 20-300 | 0.5-0.7 |
| Orange | 20-300 | 0.3-0.6 |
| Green | 20-300 | 0.3-0.7 |
| Brown | 20-300 | 0.3-0.6 |
| Slate | 20-300 | 0.3-0.5 |
| White | 20-300 | 0.2-0.7 |
| Red | 20-300 | 0.5-0.8 |
| Black | 20-300 | 0.5-0.8 |
| Yellow | 20-300 | 0.5-0.8 |
| Violet | 20-300 | 0.5-0.8 |
| Rose | 20-300 | 0.6-0.9 |
| Aqua | 20-300 | 0.5-0.8 |

Taking as an example a blue color layer 16 of 30 μm thickness, the composition of the color layer 16 is selected to achieve a contrast ratio of no more than 0.7 as provided in Table 2 so as to maintain legibility of the underlying printing layer 18. However, in order to clearly discern the blue color of the ribbon 10, the composition of the color layer 16 is selected to achieve a contrast ratio of at least 0.5 as provided in Table 2. It is noted that the example of a blue color layer 16 was given, but performance of a contrast ratio measurement according to ASTM 2805 is the same for every color. That is, ASTM 2805 does not define different testing procedures on the basis of color analyzed.

In embodiments, the composition of the color layer 16 includes a colorant and a base resin. In embodiments, the colorant is one or more pigments dispersed in a base resin, such as the embodiments of the base resin described above with respect to the opacifying layer 14. The colorant may be preferably a different composition form the opacifier. A variety of pigments are suitable for use in the pigment-based color dispersion. An exemplary black pigment includes carbon black. Exemplary white pigments include $TiO_2$, $BaSO_4$, ZnO or ZnS. Exemplary yellow pigments include diarylide yellow and diazo-based pigments. Exemplary blue pigments include phthalocyanine blue, basic dye pigments, and phthalocyanines. Exemplary red pigments include anthraquinone (red), napthole red, monoazo-based pigments, quinacridone pigments, anthraquinone, and perylenes. Exemplary green pigments include phthalocyanine green and nitroso-based pigments. Exemplary orange pigments include monoazo- and diazo-based pigments, quinacridone pigments, anthraquinones and perylenes. Exemplary violet pigments include quinacrinode violet, basic dye pigments and carbazole dioxazine based pigments. The colors of aqua, brown, gray, and rose can be formulated by combining the pigments of the other colors listed above.

In accordance with aspects of the present disclosure, fiber types for use in the ribbon may include G.652, G.657.B3, G.657.A2/B2, G.657.A1. These fiber types can have a 1310 μm MFD from 8.2 to 9.6 microns. Individual fiber diameters may range from 250 microns (or 258 microns if colored), 200 microns (or 208 microns if colored), or below. The higher cost, special bend fibers with MFDs at 8.8 μm or other lower MFDs may be used in cases where there is a particularly identified requirement, for example if the stripped fiber is stored outside the cable in a very tight splice tray. In addition, the special bend fibers may enable even smaller diameter cables with higher densities if the fibers are less than 200 microns in diameter, such as 185 microns or less. Moreover, the individual fibers in a ribbon may be set to have a core spacing set to match a predetermined core spacing. For example, individual fibers may not necessarily be abutting in planar alignment but may have gaps in between neighboring fibers, in particular if core spacing for smaller diameter fibers (e.g., 200 micron fiber ribbons) is desired to align with the higher core spacing of a larger diameter fiber ribbon (e.g., 250 micron fiber ribbons).

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that any particular order be inferred. In addition, as used herein, the article "a" is intended to include one or more than one component or element and is not intended to be construed as meaning only one.

It will be apparent to those skilled in the art that various modifications and variations can be made without departing from the spirit or scope of the disclosed embodiments. Since modifications, combinations, sub-combinations and variations of the disclosed embodiments incorporating the spirit and substance of the embodiments may occur to persons skilled in the art, the disclosed embodiments should be construed to include everything within the scope of the appended claims and their equivalents.

What is claimed is:

1. An optical fiber ribbon, comprising:
   a plurality of optical fibers arranged in a row having a first width, wherein a first indicator fiber is provided at a first edge of the row and a second indicator fiber is provided at a second edge of the row and wherein the first indicator fiber has a first fiber jacket having a different color than a second fiber jacket of the second indicator fiber;
   a primary matrix into which the plurality of optical fibers is embedded, the primary matrix having an outer surface;
   an opacifying layer having a second width and comprising a first base resin and an opacifier;
   a secondary matrix that surrounds the primary matrix, the secondary matrix serving as a color layer distinct from the opacifying layer, the color layer having a third width and comprising a second base resin and a colorant, wherein the colorant is a different composition from the opacifier, and wherein the opacifying layer is contained by the secondary matrix such that the opacifying layer is at least partially in contact with the outer surface of the primary matrix; and
   a layer of printing disposed on the outer surface of the primary matrix;
   wherein the first width is greater than at least one of the second width or the third width such that the first indicator fiber and the second indicator fiber each extend widthwise past at least one of the opacifying layer or the color layer.

2. The optical fiber ribbon of claim 1, wherein the plurality of optical fibers comprises at least one interior fiber disposed in the row between the first indicator fiber and the second indicator fiber and wherein a first average thickness T1 of the secondary matrix over the at least one interior fiber is from 10 μm to 35 μm.

3. The optical fiber ribbon of claim 2, wherein a second average thickness T2 of the opacifying layer is from 20% to 100% of the first average thickness T1.

4. The optical fiber ribbon of claim 1, wherein the plurality of optical fibers comprises at least one interior fiber disposed in the row between the first indicator fiber and the second indicator fiber and wherein the opacifying layer is coated onto the at least one interior fiber.

5. The optical fiber ribbon of claim 4, wherein the opacifying layer has an average thickness of from 5 μm to 50 μm.

6. The optical fiber ribbon of claim 1, wherein the first width of the row of the plurality of optical fibers is greater than both of the second width of the opacifying layer and the third width of the color layer.

7. The optical fiber ribbon of claim 1, wherein a cross-section of the optical fiber ribbon transverse to a longitudinal axis of the optical fiber ribbon has a midline defining a first portion above the midline and a second portion below the midline and wherein the color layer and the opacifying layer are located in only one of the first portion or the second portion.

8. The optical fiber ribbon of claim 1, wherein a cross-section of the optical fiber ribbon transverse to a longitudinal axis of the optical fiber ribbon has a midline defining a first portion above the midline and a second portion below the midline and wherein the color layer and the opacifying layer are located in both of the first portion and the second portion.

9. An optical fiber ribbon, comprising:
- a plurality of optical fibers arranged in a row having a first width, wherein the plurality of optical fibers comprises a first indicator fiber provided at a first edge of the row, a second indicator fiber provided at a second edge of the row, and at least one interior fiber disposed in the row between the first indicator fiber and the second indicator fiber and wherein the first indicator fiber has a first fiber jacket having a different color than a second fiber jacket of the second indicator fiber;
- a primary matrix into which the plurality of optical fibers is embedded, the primary matrix having an outer surface;
- a first color layer comprising a first base resin and a first colorant, wherein the first color layer defines a first continuous coating over at least a portion of the first interior fiber;
- an opacifying layer coated onto the at least one interior fiber such that the opacifying layer and the first color layer are embedded in the primary matrix;
- a layer of printing disposed on the outer surface of the primary matrix; and
- a secondary matrix surrounding the primary matrix such that the layer of printing is disposed between the primary matrix and the secondary matrix.

10. A method of preparing an optical fiber ribbon, comprising the steps of:
- arranging a plurality of optical fibers in a row, the plurality of optical fibers comprising a first indicator fiber at a first end of the row, a second indicator fiber at a second end of the row, and at least one interior fiber disposed in the row between the first indicator fiber and the second indicator fiber;
- coating, in a first applicator, the at least one interior fiber with an opacifying layer comprising a first base resin and an opacifier;
- coating the opacifying layer with a color layer in the first applicator;
- applying a primary matrix around the plurality of optical fibers in the first applicator during the step of coating;
- printing information including characteristics of the optical fiber ribbon onto the primary matrix; and
- applying a secondary matrix around the primary matrix in a second applicator such that the printed information is disposed between the primary matrix and the secondary matrix.

11. The method of claim 10, wherein the secondary matrix comprises a colorant.

12. The method of claim 10, wherein a cross-section of the optical fiber ribbon transverse to a longitudinal axis of the optical fiber ribbon has a midline defining a first portion above the midline and a second portion below the midline; and
- wherein the color layer and the opacifying layer are located in both of the first portion and the second portion.

* * * * *